Aug. 21, 1956  E. B. ANNIS  2,759,388
RETAINING PIN WITH PIVOTED LATCHING MEANS
Original Filed Feb. 4, 1952
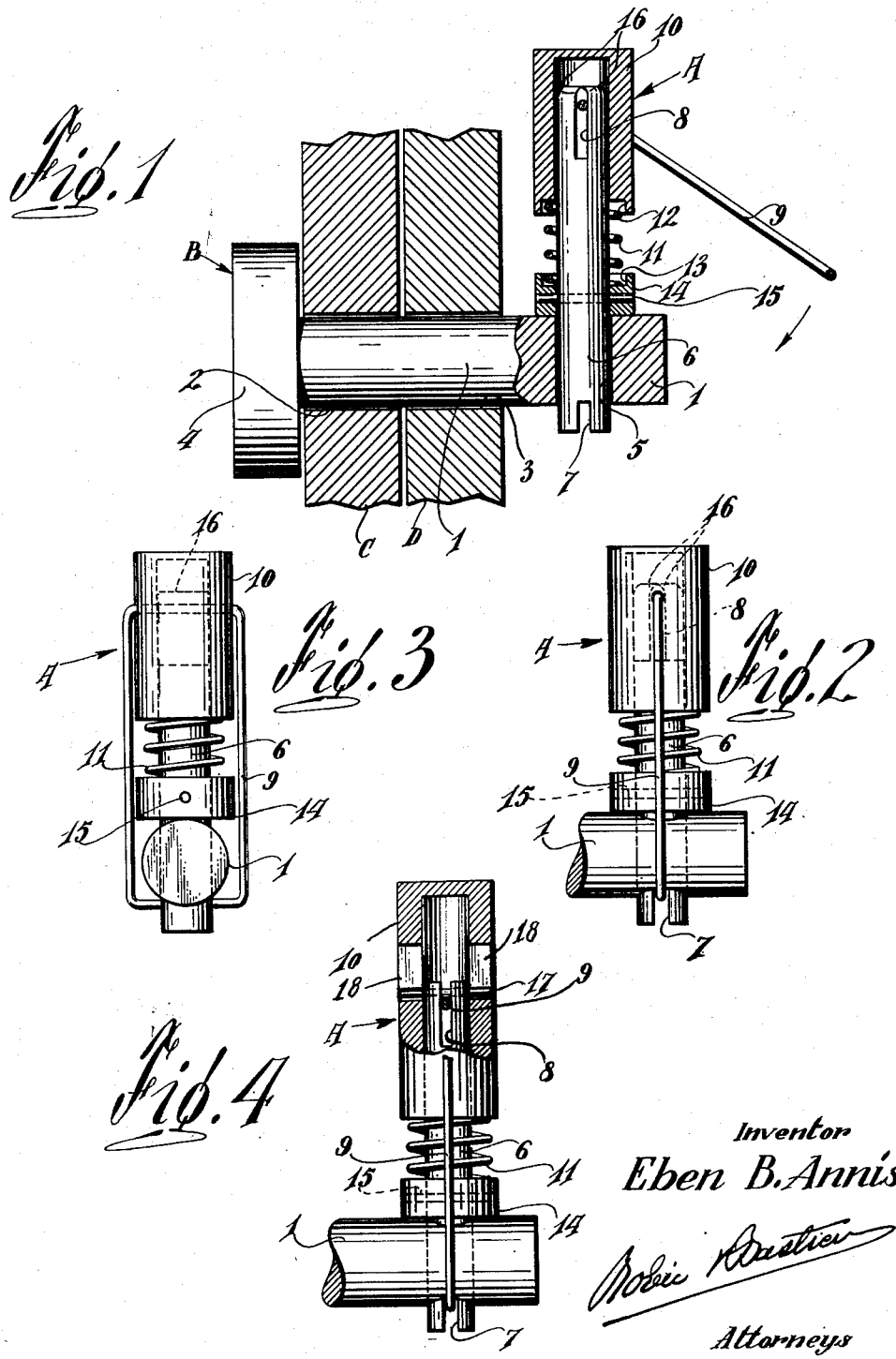
Inventor
Eben B. Annis
Attorneys

United States Patent Office 2,759,388
Patented Aug. 21, 1956

2,759,388

RETAINING PIN WITH PIVOTED LATCHING MEANS

Eben B. Annis, South Stukely, Quebec, Canada

Original application February 4, 1952, Serial No. 269,797, now Patent No. 2,633,367, dated March 31, 1953. Divided and this application February 24, 1953, Serial No. 338,534

4 Claims. (Cl. 85—8.3)

The present invention relates to a safety locking pin and is a division of U. S. patent application Serial No. 269,797 filed February 4, 1952, now Patent No. 2,633,367.

The general object of the present invention is the provision of a locking pin adapted to prevent a king pin or the like from freeing the parts secured thereby.

An important object of the present invention is the provision of a locking pin which will not become accidentally disengaged by brush and other agents and will not be subject to clogging by dirt, mud and the like foreign matter.

Another important object of the present invention is the provision of a safety locking pin which may be easily and quickly attached and removed, and which is simple and inexpensive to manufacture.

The foregoing and other important object of the present invention will become more apparent during the following disclosure and by referring to the drawings, in which:

Figure 1 is a longitudinal section of the safety locking pin according to the invention in position on a king pin which fastens two plate members;

Figure 2 is a side elevation of the pin in locking position;

Figure 3 is an elevation of the locking pin looking at the end of the king pin; and Figure 4 is a side view, partly in section, of a modification of the locking pin.

Referring now more particularly to the drawings in which like reference characters indicate like elements throughout, the locking pin, generally indicated at A, serves to lock a king pin B which secures two plates C and D together.

The king pin B may be of the type having a cylindrical stem 1 adapted to be inserted in aligned bores 2 and 3 of the plates C and D respectively, one end of the stem 1 being provided with a head 4 abutting the plate C, and the other end of the stem 1 having a transverse bore 5 for receiving the spindle 6 of the locking pin A. Said spindle 6 is provided at both ends with transverse grooves 7 and 8 respectively, for receiving a rectangular wire loop 9. One end of said loop passes through a head 10 in the form of a cup shaped member slidably mounted on one end of the spindle 6 and is urged out of engagement with the latter by means of a coil spring 11 surrounding the spindle 6 and its ends engaging annular grooves 12 and 13 made in the inner end face of the head 10 and in the opposite end face of a collar 14 respectively.

The collar 14 is rigidly secured to the middle portion of the spindle 6 by welding or by means of a transverse pin 15, as shown in Figure 1. When the collar 14 abuts the stem 1 of king pin B, the free end of the spindle 6 of the locking pin A projects outwardly from the transverse bore 5 of the king pin B.

It will be understood that a downward thrust of the head 10 will enable the free end of the wire loop 9 to pass over the free end of the king pin B and engage the groove 7 of the spindle 6 of the locking pin A. Upon release of the head 10, the loop 9 will be maintained firmly against the bottom of the groove 7 by the action of spring 11.

In order to prevent disengagement of the wire loop 9 and head 10 from the spindle 1, the top of the groove 8 is closed by pressing the free ends of the spindle 1 together as shown at 16 in Figure 1, or by inserting a pin 17 transversely across the groove 8, as shown in Figure 4. In the latter modification, the pin 17 may project beyond the sides of the spindle 1 and engage registering slots 18 made in the head 10, whereby said pin 17 may be easily removed to disassemble the locking pin A according to the invention.

It will be noted that in the locking pin, according to the invention, only the lower groove 7 may become clogged by dirt, mud or the like, but, due to the small area of said groove and the downward movement of the loop A, it will be relatively easy to clear the same and disengage the said loop for removal of the locking pin A.

Although the safety pin of the invention has been shown, as an example, to secure a king pin, it is obvious that said safety pin may be used as well for securing a shaft, iron plates or other members calculated to be held together in removable position.

While preferred embodiments according to the present invention have been illustrated and described, it is understood that various modifications may be resorted to without departing from the spirit and scope of the appended claims.

I claim:

1. A safety locking pin comprising a spindle having a transverse groove at both ends, a collar fixed to the intermediate portion of said spindle, a cup shaped member slidably mounted on one end of said spindle, a coil spring surrounding said spindle between said collar and said cup shaped member for urging said member away from the collar and a wire loop having one end passing through and rotatably mounted in said cup shaped member but prevented from axial movement relative to said cup shaped member, said one end of said wire loop passing through the groove at the end of the spindle engaging said cup shaped member, and means to prevent disengagement of said one end of said wire loop from said last named groove, said wire loop adapted to rotate about said cup shaped member from a position with its free end disengaged from said spindle to a position with its free end engaging the groove at the free end of said spindle, said wire loop being urged by said spring urged cup shaped member within said groove while in said latter engaged position.

2. In combination with a member having a transverse bore at one end, a safety locking pin for said member comprising a spindle engageable in said transverse bore to protrude from the same, and having a transverse groove at both ends, a collar fixed to the intermediate portion of said spindle and adapted to abut said member, a cup shaped member slidably mounted on one end of said spindle, a coil spring surrounding said spindle between said collar and said cup shaped member for urging said member away from said collar, a rectangular wire loop having one end passing through and rotatably mounted in said cup shaped member but prevented from linear movement relative to said cup shaped member, said one end of said wire loop passing through the groove at the end of said spindle engaging said cup shaped member, means to prevent disengagement of said wire loop from said same groove, said wire loop adapted to rotate about said cup shaped member from a position with its free end disengaged from said spindle to a position with its free end engaging the groove at the free end of said spindle, said wire loop being urged by said spring urged cup shaped member within said groove while in said latter engaged position.

3. The combination as claimed in claim 2, wherein said coil spring engages annular recesses made at the opposite faces of said cup shaped member and collar respectively.

4. The combination as claimed in claim 3, wherein said means for preventing disengagement of said wire loop from the groove at the end of the spindle supporting said cup shaped member, include a transverse pin passing through said spindle across said groove and through aligned slots made in said cup shaped member.

References Cited in the file of this patent

UNITED STATES PATENTS

| | | |
|---|---|---|
| 119,494 | Barnum | Oct. 3, 1871 |
| 1,918,148 | Strickland | July 11, 1933 |
| 2,018,191 | Schmidt | Oct. 22, 1935 |
| 2,482,907 | Hagen | Sept. 27, 1949 |